Aug. 8, 1961  J. HLAVKA  2,995,197
POST HOLE AUGER STRUCTURE
Filed June 13, 1958  2 Sheets-Sheet 2
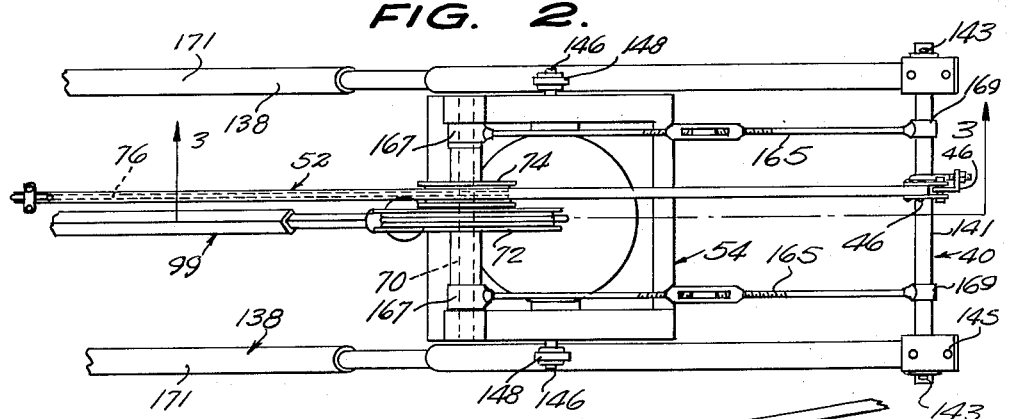
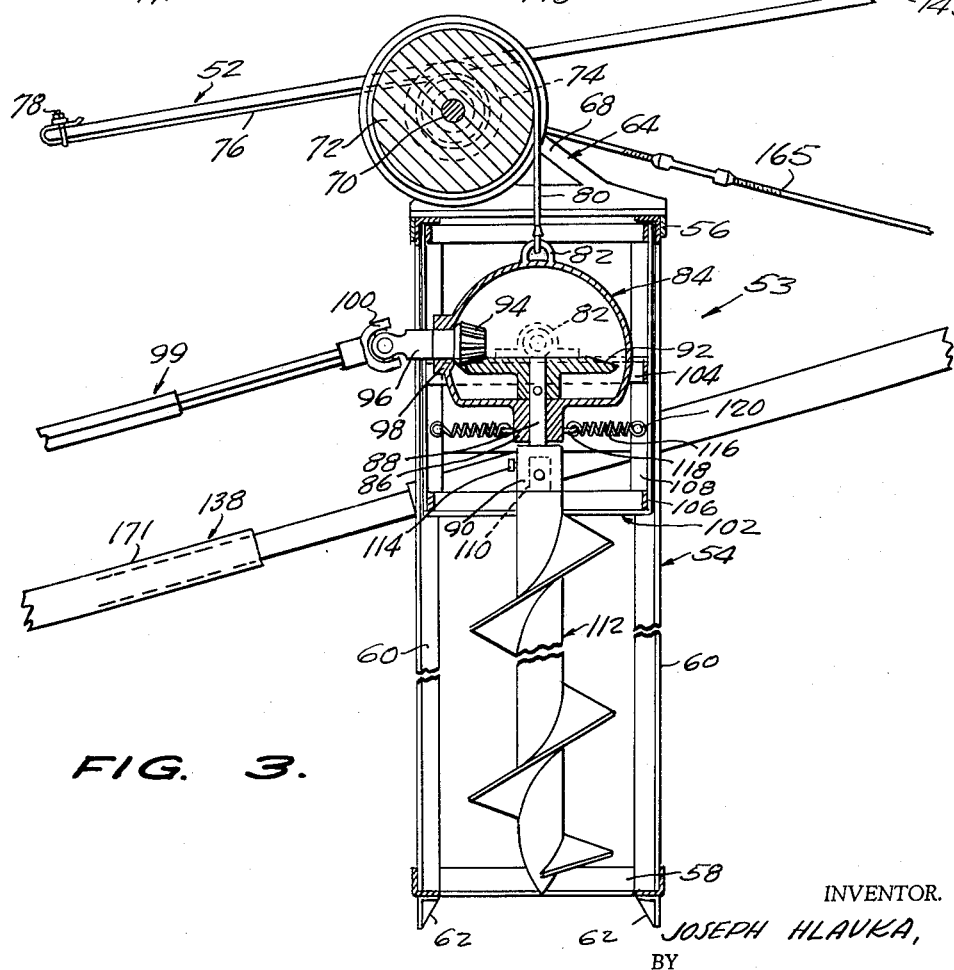
INVENTOR.
JOSEPH HLAVKA,
BY
McMorrow, Berman & Davidson
ATTORNEYS.

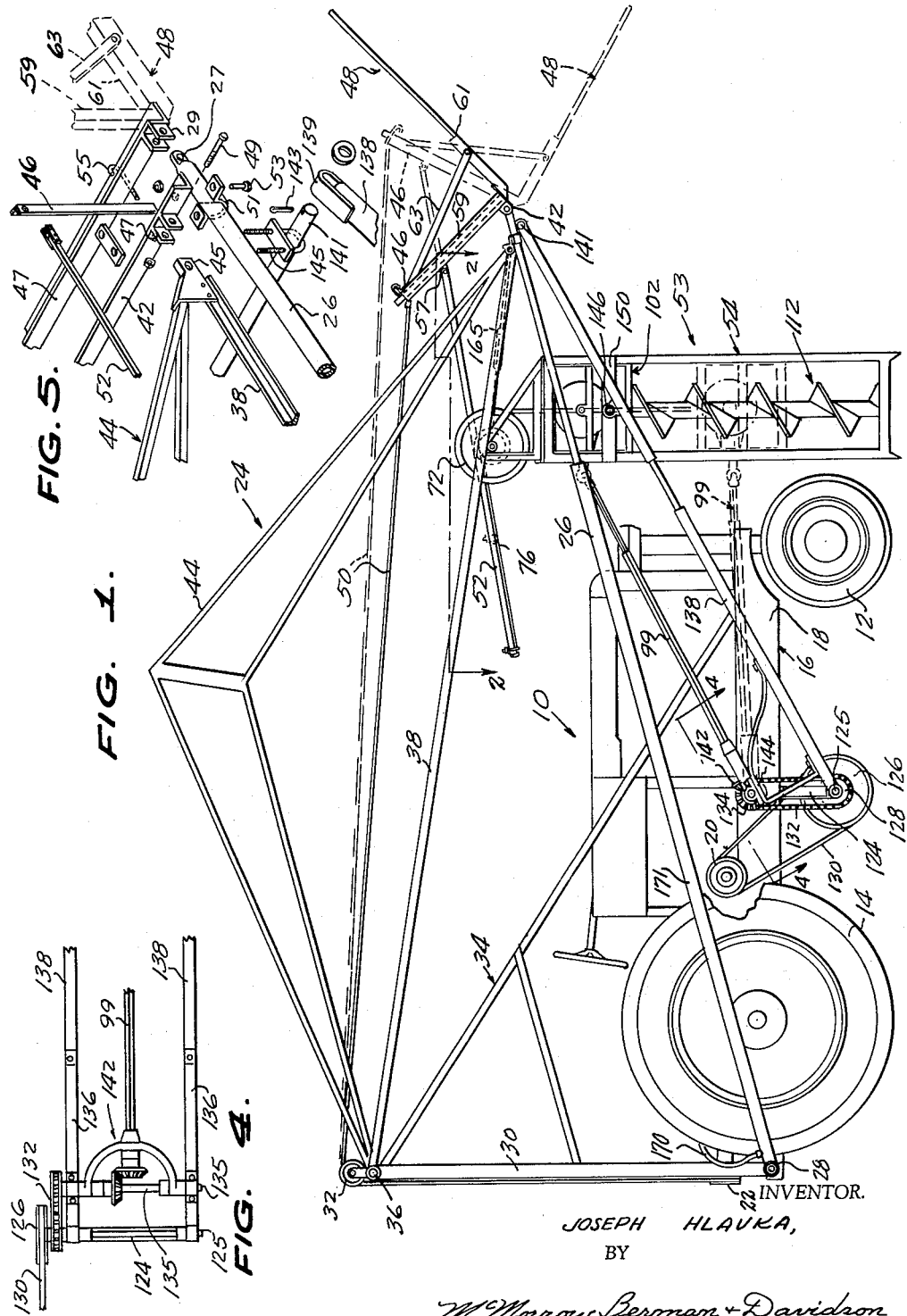

_United States Patent Office_

2,995,197
Patented Aug. 8, 1961

2,995,197
POST HOLE AUGER STRUCTURE
Joseph Hlavka, Rte. 2, Gregory, S. Dak.
Filed June 13, 1958, Ser. No. 741,914
2 Claims. (Cl. 175—220)

This invention relates to improved farm tractor-mounted and tractor-operated post hole augers, and more particularly to a post hole auger of this kind which is operatively mounted on a tractor carried hand lift frame ordinarily used for scooping up and lifting such as hay or manure.

The primary object of the invention is to provide post hole auger structure of the character indicated above wherein an ordinary hay or manure lift frame, already mounted on a tractor, is utilized as the carrier and operator of a post hole auger assembly, drivingly connected to power take-off means on the tractor, and serves to raise and lower the auger assembly relative to the ground in post hole digging operations and to hold the tractor stationary while a post hole is being dug, the auger assembly being raised and lowered by the operating means which raises and lowers the hand lift scoop.

Another object of the invention is to provide, in the structure indicated above, a post hole auger assembly which involves a four-sided relatively stationary vertical frame, which is mounted on and depends from the hand lift frame, an auger-carrying slide slidably mounted within the stationary frame, and an auger bit which is freely suspended within the slide and is spring-centered therein, the stationary frame having on its lower end ground-piercing means for holding the stationary frame in place when on the ground.

Other important objects and advantageous features of the invention will be apparent from the following description, and the accompanying drawings, wherein, for purposes of illustration only, a specific form of the invention is set forth in detail.

In the drawings:

FIGURE 1 is a right hand side elevation of a tractor mounted hand lift frame having thereon a post hole auger assembly of the invention, the latter being in depressed, ground-engaging position;

FIGURE 2 is an enlarged fragmentary horizontal section, taken on the line 2—2 of FIGURE 1;

FIGURE 3 is a fragmentary vertical longitudinal section taken on the line 3—3 of FIGURE 2;

FIGURE 4 is an enlarged fragmentary horizontal section taken on the line 4—4 of FIGURE 1; and FIGURE 5 is an exploded perspective view of the upper right hand part of FIGURE 1.

Referring in detail to the drawings, wherein like numerals designate like parts throughout the several views, the numeral 10 generally designates a conventional form of farm tractor, having steerable front wheels 12, and rear drive wheels 14, on a horizontal tractor chassis frame 16 having a right hand frame side member 18. Projecting laterally beyond the side member 18 in the region of a related drive wheel 14 is a first power take-off pulley 20, and extending rearwardly from the tractor is a second power take-off drum 22.

Mounted on the side member 18 of the tractor chassis frame 16 is a hand lift frame, generally designated 24, which comprises two laterally spaced lower forwardly inclined telescoping jacks 26, which have rear ends pivotally mounted, at 28 on the rear end of the chassis frame 16. An upstanding vertical frame member 30 is connected to and between the rear ends of the jacks 26, and has centrally on its upper end a sheave pulley 32. The rear frame member 30 is biased in perpendicular position by forwardly declining brace means 34 secured at the forward end thereof to forward portions of the chassis frame side member 18.

Pivoted at their rear ends at 36 on the upper part of the frame member 30 are forwardly extending upper non-telescoping bars 38, which are secured together and to the forward ends of the lower telescoping jacks 26 by means generally designated 40 which includes a cross bar 42, as seen in FIGURE 5. Inverted V-shaped cantilever struts 44 extend along and above and are suitably secured at their opposite ends to related ends of the upper bar 38.

As shown in FIGURE 5, the struts 44 have lugs 45 on their forward ends which are pivoted between ears 47 on the cross bar 42 by bolts 49. Straps 51 embracing the forward ends of the jacks 26 are secured by bolts 53 to the ends of the cross bar 42. On the forward ends of the jacks 26 are lugs 27 which are pivoted between ears 29 on the ends of a rear cross member 47 of a scoop which is generally designated 48. An upstanding lever 46 is secured at its lower end on an intermediate part of the scoop cross member 47, as by J-bolts 55. The forward end of a scoop operating rod 52 is pivoted, as indicated at 57, to an intermediate part of the lever 46. The scoop 48 includes upstanding side members 59 suitably secured at their lower ends to ends of the cross member 47 and side members 61 suitably secured at right angles at their rear ends to the ends of the cross member 47, with diagonal brace members 63 extending between the members 59 and 61. The scoop 48 can be moved between elevated and depressed angular positions by means of a cable 50 which is secured to the upper end of the lever 46 and is trained rearwardly to and downwardly around the sheave pulley 32 and is secured around the rear power take-off pulley 22.

The auger assembly of the invention, which is suspended from the above described hand lift frame 24, and is generally designated 53, comprises a vertically elongated, open, four-sided relatively stationary auger frame, generally designated 54, which comprises open rectangular upper and lower sub-frames 56 and 58, to whose corners are fixed related ends of angle iron vertical members 60. Fixed on the lower sub-frame 58 and depending therefrom at their corners thereof, are transverse ground-piercing cleats 62 which are provided to hold the auger frame 54 in place when lowered to the ground for a post hole digging operation.

Fixed on and upstanding on the upper sub-frame 56 is a bracket 64 having rearwardly inclined side members 68 between and in whose rear ends is journaled a transverse shaft 70 on which are mounted, in side-by-side relation, a relatively large pulley wheel 72 and a smaller diameter drum 74. A cable 76, secured, as indicated at 78, to the rear end of the scoop operating rod 52, is wound forwardly and downwardly around the smaller drum 74 and secured thereto in suitable manner. Wound around, and suitably secured to the larger pulley wheel 72 and coming off the front side thereof, is another cable 80 which is secured, as indicated at 82, to the upper end of a closed gear case 84, which is spacedly disposed within the stationary auger frame 54 below the upper sub-frame 56 thereof, as shown in FIGURE 3.

Vertically journaled in a bearing 86 fixed on the bottom of the gear case 84 is a stub shaft 88 having a socket 90 on its lower end below the bearing 86. Within the gear case 84 a bevel gear wheel 92 is fixed on the stub shaft 88, and is in mesh with a bevel pinion 94 fixed on a shaft 96 which extends rearwardly through a bearing 98 in the side wall of the gear case 84. A telescoping drive shaft 99 is universally connected at its forward end, as indicated at 100 to the pinion shaft 98.

A four-sided open-work slide 102 comprises upper and lower sub-frames 104 and 106 with vertical angle iron members 108 extending therebetween at the corners thereof, and slidably engaging the angle iron corner members 60 of the stationary auger frame 54. The gear case 84 is supported in the upper subframe 104 of the slide 102. The stub 110 on the upper end of an auger 112 is secured non-rotatably in the socket 90, as by means of a set screw 114. Auger centering means or springs 116 are secured to and are stretched between the bearing 86 and related angle iron members 108 of the slide 102, as indicated at 118 and 120, respectively, and serve to cushion deviation of the auger 112 relative to the slide 102 and the stationary frame 54, when the auger 112 is in operation, and to return the auger 112 to centered axial position in the frame 54.

In view of the above described arrangements, rearward endwise movement of the scoop operating rod 52, incidental to elevation of the scoop 48 produced by rearward pulling of the cable 50, produces counterclockwise rotation of the smaller drum 74 and hence of the larger pulley wheel 72, so that the cable 80 thereon is pulled up and the auger 112 is elevated in the auger frame 54, and the frame 54 is elevated, relative to the ground. Forward endwise movement of the scoop operating rod 52, by reverse operation of the cable 50, lets the frame 54, and then the auger 112, down to ground-engaging positions. Forward depression of the hand lift frame 10, and forward and downward swinging of the scoop 48 can place the lower end 122 of the scoop 48 on the ground, for steadying the entire structure during a post hole digging operation.

The auger assembly 53 further comprises a bracket 124 which is suitably secured to the underside of the tractor chassis frame side member 18, and which has journaled transversely thereon a shaft 125 having fixed on its inward end a relatively large diameter pulley wheel 126 and a smaller diameter lower sprocket wheel 128. A belt 130 is trained around the pulley wheel 126 and the tractor power take-off pulley 20. A sprocket chain 132 is trained around the lower sprocket wheel 128 and around an upper sprocket wheel 134 which is fixed on a shaft 135 which is journaled on upstanding saddles 136. The saddles 136 are fixed along the rear end portions of related ones of two forwardly inclined telescoping rods 138 which are pivotally mounted on related ends of the lower shaft 125 carrying the pulley wheel 128 and lower sprocket wheel 128. The rods 138 have eyes 139 on their forward elevated ends, as shown in FIGURE 5, which are journaled on the rods of a cross rod 141 and retained thereon by such as cotter pins 143. The rod 141 is secured to the jacks 26 by such as bolted clamps 145. The rear end of the auger driving shaft 99 is operatively connected by suitable bevel gear means 142 to the shaft 135, whereby the auger 112 is drivingly rotated when the tractor power take-off pulley 20 is operated.

The auger frame 54 is mounted on and between the telescoping rods 138 by means of lateral trunnions 146 journaled in brackets 148 fixed on side members 150 fixed on related sides of the auger frame 54 near the upper end thereof, so that the auger frame 54 tends to assume a perpendicular position relative to the ground due to the action of gravity. A pair of turnbuckle rods 165 have sleeves 167 and 169 on opposite ends which embrace the shaft 70 and the rod 141 to stabilize the auger frame 54 in a vertical position.

For elevating and depressing the hand lift frame 24, a hydraulic line 170 leading from a pump (not shown) on the tractor is connected to the rear end of the cylinders 171 of the jacks 26.

Although I have shown and described herein a specific form of my invention, it is to be understood that any change or changes in the structure and in the relative arrangements of the components are contemplated as being within the spirit and scope of the invention as defined by the claims appended hereto.

What is claimed is:

1. An auger assembly comprising a vertically elongated relatively stationary frame comprising open upper and lower sub-frames, vertical slideways spaced around said frame and extending between and spacing said sub-frames, an open slide within said stationary frame having elements spaced therearound and confined to slide in said slideways, an auger suspended on the frame and depending through said slide and the frame out of contact with said slide, rotating means operatively connected to the auger, and springs secured to the slide at points spaced therearound and to the auger at points spaced therearound and extending between the slide and the auger and serving to yieldably center the auger in the slide and in the stationary frame and to resist vertical movements of the auger relative to the slide.

2. An auger assembly comprising a vertically elongated relatively stationary frame comprising open upper and lower sub-frames, vertical slideways spaced around said frame and extending between and spacing said sub-frames, an open slide within said stationary frame having elements spaced therearound and confined to slide on said slideways, an auger suspended on the frame and depending through said slide and the frame out of contact with said slide, rotating means operatively connected to the auger, and springs secured to the slide at points spaced therearound and to the auger at points spaced therearound and extending between the slide and the auger and serving to yieldably center the auger in the slide and in the stationary frame and to resist vertical movements of the auger relative to the slide, said spring means comprising helical springs stretched between the auger and the slide.

References Cited in the file of this patent

UNITED STATES PATENTS

| | | |
|---|---|---|
| 1,564,893 | Prellwitz | Dec. 8, 1925 |
| 1,602,375 | Gibson | Oct. 5, 1926 |
| 2,295,917 | Schwan | Sept. 15, 1942 |
| 2,521,895 | Bunting | Sept. 12, 1950 |
| 2,547,609 | Vanderzee | Apr. 3, 1951 |
| 2,564,188 | Burg et al. | Aug. 14, 1951 |
| 2,578,033 | Austin et al. | Dec. 11, 1951 |
| 2,812,162 | Lay | Nov. 5, 1957 |
| 2,856,156 | Young | Oct. 14, 1958 |

FOREIGN PATENTS

| | | |
|---|---|---|
| 146,759 | Australia | June 10, 1952 |